US007938213B2

(12) United States Patent
Khouw

(10) Patent No.: US 7,938,213 B2
(45) Date of Patent: May 10, 2011

(54) VEHICLE DRAIN HOLE STRUCTURE

(75) Inventor: Raymond Khouw, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 265 days.

(21) Appl. No.: 12/201,774

(22) Filed: Aug. 29, 2008

(65) Prior Publication Data

US 2010/0050578 A1   Mar. 4, 2010

(51) Int. Cl.
*A61L 2/00* (2006.01)
*F02D 41/00* (2006.01)
*F16T 1/00* (2006.01)
*F25B 13/00* (2006.01)
*F25B 41/06* (2006.01)
*B60K 11/00* (2006.01)
*B60K 13/00* (2006.01)

(52) U.S. Cl. ....... 180/68.1; 180/335; 422/292; 422/300; 123/702; 123/439; 123/25 N; 123/337; 137/171; 137/183; 137/182; 138/37; 138/40; 138/44; 62/324.6; 62/511

(58) Field of Classification Search .................. 422/292, 422/300; 123/702, 439, 25 N, 337; 137/171, 137/183, 182; 138/37, 40, 44; 62/324.6, 62/511; 180/68.1, 335
See application file for complete search history.

(56) References Cited

U.S. PATENT DOCUMENTS

| 4,424,989 A | | 1/1984 | Spencer et al. |
| 5,060,686 A | * | 10/1991 | Troy ............................. 137/171 |
| 5,529,244 A | * | 6/1996 | Horvath et al. ............... 239/318 |
| 6,539,977 B1 | | 4/2003 | Hutchinson et al. |
| 2007/0221161 A1 | | 9/2007 | Khouw et al. |

* cited by examiner

*Primary Examiner* — Jill Warden
*Assistant Examiner* — Monzer R Chorbaji
(74) *Attorney, Agent, or Firm* — Rankin Hill & Clark LLP

(57) ABSTRACT

A vehicle drain hole structure includes an enclosure (e.g., an air intake tube, an intake enclosure, a resonator, a cleaner, etc.) defined by at least one wall. The at least one wall has an inner surface and an outer surface. A drain hole is defined in the at least one wall for providing drainage from the enclosure. The drain hole extends from a first end defined in the inner surface to a second end defined in the outer surface. The first end of the drain hole at the inner surface has a larger cross-sectional area than the second end of the drain hole at the exterior surface to reduce the likelihood of a liquid film forming across the drain hole.

18 Claims, 1 Drawing Sheet

VEHICLE DRAIN HOLE STRUCTURE

BACKGROUND

The present disclosure relates to a vehicle drain hole structure, and particularly relates to an improved vehicle drain hole structure (e.g., of the type formed in a plastic part of a vehicle's induction system) that prevents or reduces the likelihood of a liquid film forming thereacross.

Vehicles are known to employ any number of drain holes for preventing water from accumulating and/or for directing accumulated water out of the vehicle or components thereof. One area where drain holes are used is the vehicle's induction system. For example, a vehicle's induction system may include a serpentine or circuitous air passageway upstream of an engine intake manifold that includes a low section acting as a fluid trap, which allows any objects or moisture drawn into the air passageway to collect. A drain hole can be provided in the low section for directing water/moisture out of the inductive system and thereby preventing the same from entering the vehicle's engine intake manifold.

Vehicle drain holes, including those used in a vehicle's induction system, have been formed with various cross-sectional shapes, e.g., round, square, etc. However, conventional vehicle drain holes usually have a cross-sectional area that remains constant along an entire depth of the drain hole. One problem associated with these types of conventional drain hole configurations (i.e., those having a constant cross-sectional area) is that a liquid film sometimes forms across the hole, presumably due to surface tension, which is disadvantageous because it interferes with water or moisture draining through the hole.

For example, FIG. 4 illustrates a conventional vehicle drain hole 60 through wall 62. As shown, the cross-sectional area of the hole 60 remains constant as the hole extends through the wall 62 from wall surface 64 to wall surface 66. Wall 62 could be part of an air intake tube for directing air to a vehicle's engine intake manifold, for example. As can be seen from FIG. 4, a liquid film 68 can form across the hole 62 and prevent drainage through the hole 60 due to water or moisture clinging to sidewall 70 of the hole (i.e., surface tension).

Drain holes for non-vehicle applications have sometimes used tapered drain holes, but the drain hole structures forming such drain holes tend to be more complex or involved. For example, these types of drain hole structures can include added components that extend the axial or longitudinal length of the drain structure. In addition, these types of drain holes can be formed by structures that are particular to the environment in which the drain hole is used. For example, a drain hole provided in a pneumatic line may be configured with a tapered drain hole that increases in area from a first end disposed within or at an inner surface of a pneumatic line toward a second end to minimize the amount of compressed air lost through the drain hole.

SUMMARY

According to one aspect, a drain hole is configured to have a reduced material thickness around the drain hole, e.g., a tapered shape which becomes more narrow from an upper surface to a lower surface of the part in which the drain hole is defined. The reduced material thickness at the lower surface of the part, where water or moisture ultimately drains away from the part, reduces the effects of surface tension that can normally cause a water film to form across the drain hole.

According to another aspect, an improved vehicle drain hole structure is provided. More particularly, in accordance with this aspect, the vehicle drain hole structure includes an enclosure defined by at least one wall. The at least one wall has an inner surface and an outer surface. A drain hole is defined in the at least one wall for providing drainage from the enclosure. The drain hole extends from a first end defined in the inner surface to a second end defined in the outer surface. The first end of the drain hole at the inner surface has a larger cross-sectional area than the second end of the drain hole at the exterior surface to reduce the likelihood of a liquid film forming across the drain hole.

According to still another aspect, an improved drain structure is provided for an air passageway of a vehicle. More particularly, in accordance with this aspect, the drain structure includes a wall having an inner surface defining the air passageway and an outer surface. An aperture is defined through the wall for draining moisture from the air passageway. The aperture is defined by a first opening in the inner surface, a second, smaller opening in the outer surface, and a wall tapering and narrowing from the first opening in the inner surface toward the second, smaller opening in the outer surface to reduce surface tension which would otherwise tend to cause a liquid film to form across the aperture.

According to still yet another aspect, an improved drain structure is provided for an air intake passageway. More particularly, in accordance with this aspect, the drain structure includes an air intake tube defining the air intake passageway and a drain aperture disposed along the air intake tube for draining moisture therefrom. A first end of the drain aperture includes a first opening defined in an inner surface of the air intake tube. A second end of the drain aperture includes a second opening defined in an outer surface of the air intake tube. The first opening has a larger cross-sectional area than the second opening to reduce surface tension which would otherwise tend to cause a liquid film to form across the drain aperture as moisture is drained from the air intake tube.

DETAILED DESCRIPTION

Figure 1:
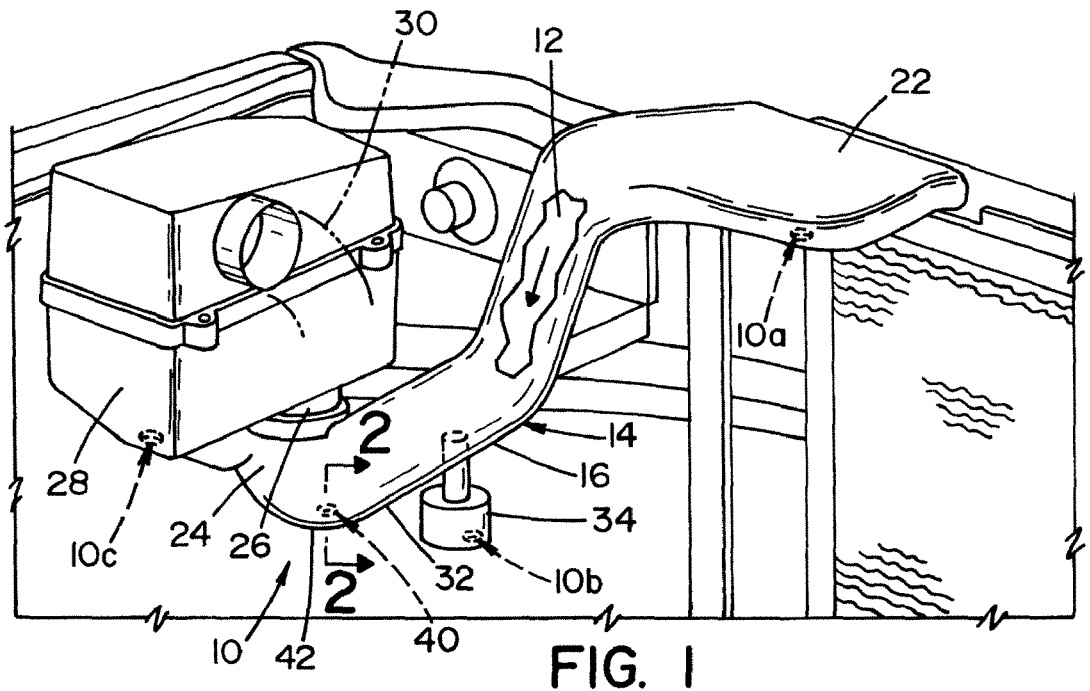
FIG. 1 is a partial rear perspective view of a vehicle's air intake system as viewed from within the vehicle's engine compartment.
Figure 2:
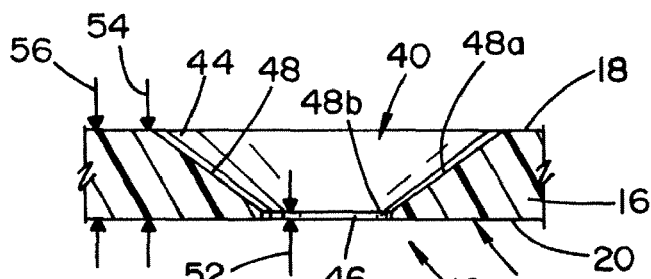
FIG. 2 is a cross-sectional view of a vehicle drain hole structure provided in an air intake tube of the air intake system taken along the line 2-2 of FIG. 1.
Figure 3:
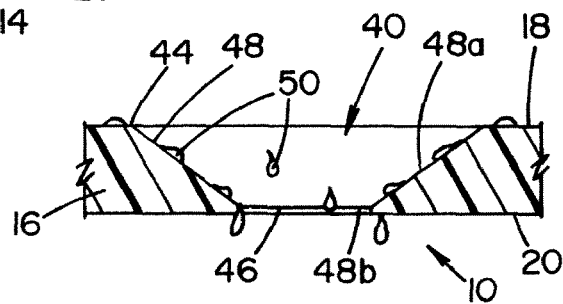
FIG. 3 is another cross-sectional view of the vehicle drain hole structure showing moisture passing therethrough without a liquid film forming across the drain hole.
Figure 4:
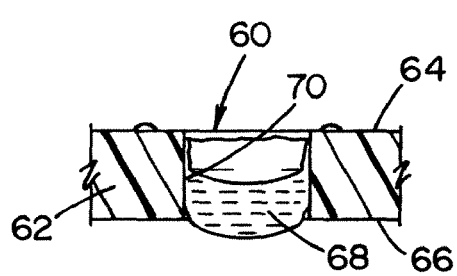
FIG. 4 is a prior art cross-sectional view of a vehicle drain hole structure showing a liquid film forming across the drain hole and thereby preventing moisture from exiting through the drain hole.

Referring now to the drawings, wherein the showings are for purposes of illustrating one or more exemplary embodiments, a vehicle drain hole structure is illustrated in FIGS. 1-3 for an enclosure or a fluid passageway (e.g., an air passageway) of a vehicle and generally indicated by reference numeral 10. In the illustrated embodiment, the fluid or air passageway to which the vehicle drain hole structure 10 is applied is an air intake passage or passageway 12 for delivering combustion air to an internal combustion engine (not shown). In the illustrated embodiment, the air intake passageway 12 is defined by an air intake tube 14. Thus, the drain hole structure 10 can also be said to be applied to an enclosure (e.g., air intake tube 14) in the illustrated embodiment. The air intake tube 14 includes at least one wall 16 which defines the passageway 12. The wall 16 can be formed of a plastic material, such as polypropylene, for example.

The at least one wall 16 of the air intake tube 14 has an inner surface 18 that defines the air passageway 12 and an outer surface 20. The illustrated air intake tube 14 includes an intake enclosure 22 formed at one end thereof and an end portion 24 connected to an intake port 26 of an air cleaner 28. The air cleaner 28 is disposed upstream of an engine intake manifold (not shown) and fluidly connected thereto by an intake manifold tube 30. Thus, in the arrangement illustrated in FIG. 1, the air intake passage 12 is disposed upstream of the air cleaner 28, which itself is fluidly connected to the engine intake manifold by the intake manifold tube 30. If desired, a resonator chamber or device 34 can be included as part of the air intake system of FIG. 1, though this is not required. For example, the resonator chamber can be physically connected to the air intake tube 14 and fluidly connected to the air passageway 12 for muffling or reducing noise of the air intake system.

As shown, the intake enclosure 22, which defines an intake entry port for receiving ambient air, is at a first elevation. Between the intake enclosure 22 and the end portion 24, the air intake tube 14 defines a low section 32, which is disposed at a second, lower elevation (i.e., lower than the first elevation of the intake enclosure 22). As shown, the end portion 24 can connect the intake tube 14 to the air cleaner 28 at a third elevation that is higher than the second elevation of the low section 32.

A drain hole or aperture 40 of the vehicle drain hole structure 10 can be disposed along the air intake tube 14 for draining moisture therefrom. More particularly, the drain hole or aperture 40 can be defined in the wall 16 forming the air intake tube 14 for providing drainage from the passageway 12. In the embodiment illustrated in FIG. 1, the drain hole 40 is located or defined in an underside portion 42 of the low section 32 of the air intake tube 14, though it is to be appreciated that the drain hole 40 or additional drain holes 40 could be provided at other locations along the air intake tube 14. In the illustrated embodiment, the underside portion 42 can be a bottom point of the air intake tube 14 adjacent the intake port 26 of the air cleaner 28 and thus an area where moisture is expected to collect. At this bottom point 42, the drain hole 40 is defined through the wall 16 for draining moisture from the air passageway 12.

A first end of the drain hole 40 includes a first opening 44 defined in the inner surface 18. A second end of the drain hole 40 includes a second opening 46 defined in the outer surface 20. Thus, the drain hole 40 extends from the first end (i.e., first opening 44) defined in the inner surface 18 to a second end (i.e., second opening 46) defined in the outer surface 20. As shown, the first end or first opening 44 of the drain hole 40 at the inner surface 18 has a larger cross-sectional area than the second end or second opening 46 of the drain hole 40 at the exterior surface 20 which, as will be described in more detail below, prevents or reduces the likelihood of a liquid film forming across the drain hole 40.

The drain hole 40, which has a circular cross-section in the illustrated embodiment, is specifically defined by the first opening 44 in the inner surface 18, the second, smaller opening 46 defined in the outer surface 20, and a radial wall 48, at least a portion of which tapers and narrows from the first opening 46 in the inner surface 18 toward the second, smaller opening 46 in the outer surface 20. This has the effect of reducing surface tension of moisture or water passing through the drain hole 40, which would otherwise tend to cause a liquid film to form across the drain hole. Of course, as will be understood and appreciated by those skilled in the art, the drain hole 40 could have some other cross-sectional shape or configuration, such as square, rectangular, etc.

In the illustrated embodiment, the radial wall or radial wall surface 48 defining the drain hole 40 extends from the inner surface 18 to the outer surface 20, but includes a taper or tapered portion 48a that becomes more narrow from the inner surface 18 toward the outer surface 20. As shown, the radial wall 48 of the illustrated drain hole structure 10 includes a cylindrical portion 48b having a constant diameter disposed immediately adjacent the outer surface 20 between the outer surface 20 and the taper 48a, though this is not required. When the drain hole 40 is circular or round, as it is depicted in the illustrated embodiment, the taper 48a of the radial wall 48 decreases a diameter of the drain hole 40 from the first end or opening 44 toward the second end or opening 46. This results in the wall 16 having a reduced thickness 52 adjacent the second end or opening 46 relative to a thickness 54 of the wall 16 adjacent the first end or opening 44. The wall 16 having reduced thickness 52 adjacent the outer surface 20 reduces surface tension around the second, smaller opening 46 and thereby prevents or reduces the likelihood of a liquid film forming across the drain hole 40. Instead water or moisture, such as droplets 50, can more easily drain through the drain hole 40 as illustrated in FIG. 3.

As shown, an entire axial extent of the drain hole 40 can be provided between the inner surface 18 and the outer surface 20. That is, no portion of the drain hole 40 extends beyond either the inner surface 18 or the outer surface 20 thereby providing a low profile drain structure that is low in complexity and manufacturing costs. More specifically, the radial wall surface 48 defines the entire axial extent or longitudinal length of the drain hole 40. No portion of the drain hole structure 10 extends beyond the inner surface 18 or the outer surface 20. The tapered portion 48a of the radial wall 48 narrows such that a material thickness of the air intake tube 14 adjacent the second opening 46 (i.e., thickness 52) is less than that adjacent the first opening 44. In contrast, the material thickness adjacent the first opening 44 (i.e., thickness 54) is substantially the same as a general thickness 56 of the air intake tube 14.

Instead of being applied to the air intake tube 14 (at the illustrated location and/or at other locations along the tube 14), or in addition to being applied to the air intake tube 14, it is to be appreciated and understood that the drain hole structure 10 (or a like drain hole structure) can be employed on other enclosures of the vehicle, such as other enclosures of the illustrated air intake system of FIG. 1. For example, as illustrated in phantom in FIG. 1, drain hole structure 10a can be provided on the intake enclosure 22, drain hole structure 10b can be provided on the resonator device 34, and/or drain hole structure 10c can be provided on the air cleaner 28, etc. The drain hole structures 10a, 10b, 10c can be the same or similar to the drain hole structure 10 and, if desired, can be positioned in alternative and/or additional locations other than those illustrated in FIG. 1.

It will be appreciated that various of the above-disclosed and other features and functions, or alternative thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle drain hole structure, comprising:
   a vehicle enclosure defined by at least one wall, said at least one wall having an inner surface generally facing upward and an outer surface that is opposite the inner surface and generally facing downward; said inner surface defining a fluid passageway that is an air intake passage of an internal combustion engine; and
   a drain hole defined in said at least one wall for providing drainage from said enclosure, said drain hole extending from a first end defined in said inner surface to a second end defined in said outer surface, said first end of said drain hole at said inner surface having a larger cross-sectional area than said second end of said drain hole at said exterior surface to reduce the likelihood of a liquid film forming across said drain hole.

2. The vehicle drain hole structure of claim 1 wherein said drain hole is defined by a radial wall surface of said at least one wall that extends from said inner surface to said outer surface, said radial wall surface including a taper that becomes more narrow from said inner surface toward said outer surface.

3. The vehicle drain hole structure of claim 2 wherein said taper of said radial wall decreases a diameter of said drain hole from said first end toward said second end.

4. The vehicle drain hole structure of claim 1 wherein said at least one wall has a reduced thickness adjacent said second end of said drain hole relative to a thickness of said at least one wall adjacent said first end of said drain hole.

5. The vehicle drain hole structure of claim 1 wherein an entire axial extent of said drain hole is provided between said inner surface and said outer surface.

6. The vehicle drain hole structure of claim 1 wherein said at least one wall is formed of a plastic material.

7. The vehicle drain hole structure of claim 6 wherein said at least one wall is formed of a polypropylene material.

8. The vehicle drain hole structure of claim 1 wherein said at least one wall forms an air intake tube disposed upstream of an engine intake manifold.

9. The vehicle drain hole structure of claim 8 wherein said intake tube is connected to air precleaner, which is disposed upstream of said engine intake manifold and fluidly connected thereto by an intake manifold tube.

10. The vehicle drain hole structure of claim 9 wherein said drain hole is formed at a bottom point of said air intake tube adjacent an intake port of said air precleaner.

11. A drain structure for an air passageway of a vehicle, comprising:
    a wall defining the air passageway of the vehicle, the wall having an inner surface defining the air passageway and an outer surface that is opposite the inner surface; and
    an aperture defined through said wall for draining moisture from the air passageway, said aperture defined by a first opening in said inner surface, a second, smaller opening in said outer surface and a wall tapering and narrowing from said first opening in said inner surface toward said second, smaller opening in said outer surface to reduce surface tension which would otherwise tend to cause a liquid film to form across said aperture, wherein said air passageway is an air intake passage of an internal combustion engine disposed upstream of an air precleaner, said precleaner fluidly connected to an engine intake manifold by an intake manifold tube.

12. The drain structure of claim 11 wherein said wall has a reduced thickness adjacent said outer surface to reduce surface tension around said second, smaller opening.

13. The drain structure of claim 11 wherein said wall forming said air intake passage is an air intake tube including an intake enclosure defining an intake entry port at a first elevation, a low section disposed at a second, lower elevation and an end portion connected to an intake port of said air precleaner disposed a third elevation that is higher than said second elevation, said aperture defined in an underside portion of said low section of said air intake tube.

14. A drain structure for an air intake passageway, comprising:
    an air intake tube defining the air intake passageway in a vehicle, the air intake tube disposed upstream of an engine intake manifold;
    a drain aperture disposed along said air intake tube for draining moisture therefrom, a first end of said drain aperture includes a first opening defined in an inner surface of said air intake tube and a second end of said drain aperture includes a second opening defined in an outer surface of said air intake tube, said first opening having a larger cross-sectional area than said second opening to reduce surface tension which would otherwise tend to cause a liquid film to form across said drain aperture as moisture is drained from said air intake tube.

15. The drain structure of claim 14 further including a radial wall surface defining an axial extent of said drain aperture, said radial wall surface extending from said inner surface to said outer surface and including a taper that narrows along at least a portion of said radial wall surface in a direction from said inner surface toward said outer surface.

16. The drain structure of claim 14 wherein a material thickness of said air intake tube is less adjacent said second opening than adjacent said first opening.

17. The drain structure of claim 16 wherein said material thickness adjacent said first opening is substantially that same as a general thickness of said air intake tube.

18. The drain structure of claim 14 wherein said air intake tube is formed of a polypropylene plastic material.

* * * * *